(12) United States Patent
Jimbo et al.

(10) Patent No.: US 10,746,241 B2
(45) Date of Patent: Aug. 18, 2020

(54) ROTOR COVER

(71) Applicant: Shimano Inc., Sakai, Osaka (JP)

(72) Inventors: Masahiko Jimbo, Osaka (JP);
Masahiro Nakakura, Osaka (JP)

(73) Assignee: Shimano Inc., Osaka (JP)

( * ) Notice: Subject to any disclaimer, the term of this patent is extended or adjusted under 35 U.S.C. 154(b) by 292 days.

(21) Appl. No.: 15/635,052

(22) Filed: Jun. 27, 2017

(65) Prior Publication Data

US 2018/0010654 A1  Jan. 11, 2018

(30) Foreign Application Priority Data

Jul. 5, 2016 (JP) ................................ 2016-133510

(51) Int. Cl.
| *F16D 65/00* | (2006.01) |
| *F16D 55/00* | (2006.01) |
| *B62L 1/00* | (2006.01) |
| *F16D 65/12* | (2006.01) |
| *F16D 55/22* | (2006.01) |
| *F16D 65/02* | (2006.01) |

(52) U.S. Cl.
CPC .......... *F16D 65/0081* (2013.01); *B62L 1/005* (2013.01); *F16D 55/00* (2013.01); *F16D 65/12* (2013.01); *F16D 55/22* (2013.01); *F16D 65/0006* (2013.01); *F16D 2055/0037* (2013.01); *F16D 2065/134* (2013.01)

(58) Field of Classification Search
CPC ................. F16D 65/0081; F16D 65/12; F16D 2055/0037; B62L 1/005
USPC ...................................... 188/218 A; 474/144
See application file for complete search history.

(56) References Cited

U.S. PATENT DOCUMENTS

| 6,371,569 | B1 * | 4/2002 | Dean ....................... | B60B 7/061 |
| | | | | 188/218 A |
| 7,341,130 | B2 * | 3/2008 | Samuelsson ............ | F16D 55/00 |
| | | | | 188/218 A |
| 7,866,450 | B2 * | 1/2011 | Nakamura ............... | F16D 55/00 |
| | | | | 188/218 A |
| 8,172,050 | B2 * | 5/2012 | Mikura ..................... | B62J 23/00 |
| | | | | 188/218 A |
| 8,491,429 | B2 * | 7/2013 | Cranston ................... | B62J 13/00 |
| | | | | 280/304.3 |
| 9,422,993 | B2 * | 8/2016 | Watarai ..................... | F16D 65/12 |

(Continued)

FOREIGN PATENT DOCUMENTS

| CN | 104696394 | * 6/2015 | ............. F16D 65/00 |
| CN | 104696394 A | 6/2015 | |

(Continued)

*Primary Examiner* — Thomas W Irvin
(74) *Attorney, Agent, or Firm* — Global IP Counselors, LLP

(57) ABSTRACT

A rotor cover is provided that limits contact of a disc brake rotor with an object flying from a radially outer side of the disc brake rotor. The rotor cover covers a disc brake rotor, which is rotatable relative to a bicycle frame. The rotor cover includes a circumferential part that at least partially covers a circumferential edge of the disc brake rotor at a radially outer side of the disc brake rotor. The circumferential part includes at least three first pieces facing the circumferential edge of the disc brake rotor, and first openings provided between two adjacent ones of the first pieces in a circumferential direction of the disc brake rotor.

18 Claims, 14 Drawing Sheets

(56) References Cited

U.S. PATENT DOCUMENTS

| | | | |
|---|---|---|---|
| 9,797,461 B2* | 10/2017 | Morse | F16D 65/0081 |
| 9,903,427 B1* | 2/2018 | McGarry | F16D 65/005 |
| 9,915,306 B2* | 3/2018 | Koshiyama | F16D 65/0081 |
| 2005/0126868 A1* | 6/2005 | Lee | F16D 55/00 |
| | | | 188/218 A |
| 2009/0194378 A1* | 8/2009 | Sand | F16D 55/00 |
| | | | 188/73.47 |
| 2013/0077908 A1* | 3/2013 | Frantz | F16D 55/00 |
| | | | 384/480 |
| 2017/0114843 A1* | 4/2017 | White | F16D 65/0081 |
| 2018/0003250 A1* | 1/2018 | Liu | F16D 65/00 |
| 2018/0010654 A1* | 1/2018 | Jimbo | F16D 55/00 |
| 2018/0010655 A1* | 1/2018 | Wen | B62J 23/00 |

FOREIGN PATENT DOCUMENTS

| | | |
|---|---|---|
| CN | 105711699 A | 6/2016 |
| DE | 202015101929 U1 | 6/2015 |

* cited by examiner

ROTOR COVER

CROSS-REFERENCE TO RELATED APPLICATIONS

This application claims priority to Japanese Patent Application No. 2016-133510, filed on Jul. 5, 2016. The entire disclosure of Japanese Patent Application No. 2016-133510 is hereby incorporated herein by reference.

BACKGROUND

Field of the Invention

The present invention generally relates to a rotor cover that covers a disc brake rotor, which is rotatable relative to a bicycle frame.

Background Information

German Utility Model Publication No. 202015101929 (Patent document 1) describes a rotor cover that covers a side surface of a disc brake rotor located at a side opposite to a bicycle frame.

SUMMARY

The above rotor cover limits contact of an object with the disc brake rotor from the lateral side of the bicycle. However, an object may come into contact with the disc brake rotor from a radially outer side of the disc brake rotor.

One object of the present invention is to provide a rotor cover that limits contact of an object with a disc brake rotor from a radially outer side of the disc brake rotor.

(1) In a first aspect of the invention, a rotor cover covers a disc brake rotor, which is rotatable relative to a bicycle frame. The rotor cover includes a circumferential part that at least partially covers a circumferential edge of the disc brake rotor at a radially outer side of the disc brake rotor. The circumferential part includes at least three first pieces facing the circumferential edge of the disc brake rotor, and a plurality of first openings provided between adjacent ones of the first pieces in a circumferential direction of the disc brake rotor.

In the rotor cover of the first aspect, the circumferential part at least partially covers the circumferential edge. This arrangement limits contact of an object with the disc brake rotor from the radially outer side of the disc brake rotor while maintaining heat dissipation properties.

(2) In a second aspect of the invention, in the rotor cover according to the first aspect, the circumferential part includes a first connection piece connected to adjacent ones of the first pieces. In the rotor cover of the second aspect, the first pieces are connected by the first connection piece. This improves the rigidity of the first pieces.

(3) In a third aspect of the invention, in the rotor cover according to any one of the preceding aspects, the first connection piece is located closer to a bicycle wheel than the disc brake rotor in an axial direction of the disc brake rotor. In the rotor cover of the third aspect, the first connection piece limits contact of an object with the disc brake rotor from the side of the bicycle wheel.

(4) In a fourth aspect of the invention, a rotor cover covers a disc brake rotor, which is rotatable relative to a bicycle frame. The rotor cover includes a circumferential part that at least partially covers a circumferential edge of the disc brake rotor at a radially outer side of the disc brake rotor. The circumferential part includes a first piece facing the circumferential edge of the disc brake rotor, a first connection piece connected to the first piece at a side closer to a bicycle wheel than the disc brake rotor in an axial direction of the disc brake rotor, and a first opening defined by at least the first piece and the first connection piece.

In the rotor cover of the fourth aspect, the circumferential part at least partially covers the circumferential edge. This arrangement limits contact of an object with the disc brake rotor from the radially outer side of the disc brake rotor.

(5) In a fifth aspect of the invention, in the rotor cover according to the fourth aspect, the first piece is one of a plurality of first pieces arranged in a circumferential direction of the disc brake rotor. The rotor cover of the fifth aspect has more portions that interrupt an object from the radially outer side of the disc brake rotor. This arrangement further limits contact of the object with the disc brake rotor.

(6) In a sixth aspect of the invention, in the rotor cover according to any one of the second, third, and fifth aspects, the circumferential part further includes a second connection piece arranged at a different location with respect to the first piece in an axial direction of the disc brake rotor. The second connection piece is connected to the first pieces. In the rotor cover of the sixth aspect, the first pieces are connected by the second connection piece in addition to the first connection piece. This further improves the rigidity of the first pieces.

(7) In a seventh aspect of the invention, in the rotor cover according to the sixth aspect, the second connection piece is arranged at an opposite side of the disc brake rotor with respect to a bicycle wheel in an axial direction of the disc brake rotor.

In the rotor cover of the seventh aspect, the second connection piece limits contact of an object with the disc brake rotor from the side of the disc brake rotor opposite to the bicycle wheel.

(8) In an eighth aspect of the invention, in the cover according to any one of the preceding aspects, each of the first openings has a greater dimension than at least one of the first pieces in a circumferential direction of the disc brake rotor.

In the rotor cover of the eighth aspect, enlargement of the first opening effectively dissipates heat of the disc brake rotor by drawing air into an inner side of the rotor cover while limiting contact of an object with the disc brake rotor.

(9) In a ninth aspect of the invention, in the rotor cover according to any one of the preceding aspects, each of the first openings has a dimension in a circumferential direction which is greater than a dimension thereof in an axial direction of the disc brake rotor. In the rotor cover of the ninth aspect, enlargement of the first opening increases the amount of air drawn into the inner side of the rotor cover.

(10) In a tenth aspect of the invention, the rotor cover according to any one of the preceding aspects further includes a side surface part facing a side surface of the disc brake rotor that is opposite to a bicycle wheel. The side surface part is connected to each of the first pieces.

In the rotor cover of the tenth aspect, the side surface part limits contact of an object with the side surface of the disc brake rotor from the side of the disc brake rotor opposite to the bicycle wheel.

(11) In an eleventh aspect of the invention, in the rotor cover according to the tenth aspect, the side surface part includes a second opening. The rotor cover of the eleventh aspect limits contact of an object with the side surface of the disc brake rotor while efficiently dissipates heat of the disc brake rotor.

(12) In a twelfth aspect of the invention, in the rotor cover according to the eleventh aspect, the side surface part further includes at least two second pieces that extend from the circumferential part toward a portion facing a central portion of the disc brake rotor. The second opening is provided between adjacent ones of the second pieces.

In the rotor cover of the twelfth aspect, the second pieces limit contact of an object with the side surface of the disc brake rotor from the side of the disc brake rotor opposite to the bicycle wheel.

(13) In a thirteenth aspect of the invention, in the rotor cover according to the twelfth aspect, the second pieces and the second opening are arranged next to one another in a circumferential direction of the disc brake rotor. The second opening has a greater dimension than at least one of the second pieces along a circumference extending about a center rotational axis of the disc brake rotor. In the rotor cover of the thirteenth aspect, enlargement of the second opening increases the amount of air drawn into the inner side of the rotor cover.

(14) In a fourteenth aspect of the invention, in the rotor cover according to any one of the eleventh to thirteenth aspects, the second opening has a larger area than each of the first openings. In the rotor cover of the fourteenth aspect, the second opening has a large area. Thus, air is easily discharged out of the inner side of the rotor cover.

(15) In a fifteenth aspect of the invention, in the rotor cover according to any one of the eleventh to fourteenth aspects, the second opening is one of at least two second openings. The rotor cover of the fifteenth aspect allows air to be easily discharged out of the inner side of the rotor cover.

(16) In a sixteenth aspect of the invention, in the rotor cover according to any one of the eleventh to fifteenth aspects, the side surface part further includes a third piece that covers each of the second openings. In the rotor cover of the sixteenth aspect, the third piece limits entrance of an object from the second opening.

(17) In a seventeenth aspect of the invention, in the rotor cover according to the sixteenth aspect, the rotor cover is positioned relative to the bicycle frame. The third piece is at least partially located below the bicycle frame. In the rotor cover of the seventeenth aspect, the third piece effectively limits entrance of an object into the second opening from a lower side of the bicycle.

(18) In an eighteenth aspect of the invention, the rotor cover according to any one of the preceding aspects further includes a positioning portion that is positioned relative to the bicycle frame. In the rotor cover of the eighteenth aspect, the rotor cover does not move relative to the bicycle frame, for example, when the bicycle is traveling. Thus, the rotor cover is stable.

(19) In a nineteenth aspect of the invention, in the rotor cover according to the third or fourth aspect or any one of the fifth to eighteenth aspects directly or indirectly depending on one of the third and fourth aspects, the first connection piece includes a projection that projects toward an axis of the disc brake rotor.

In the rotor cover of the nineteenth aspect, the projection of the first connection piece limits contact of an object with the side surface of the disc brake rotor opposed to the bicycle wheel from a side of the bicycle wheel.

(20) In a twentieth aspect of the invention, in the rotor cover according to the nineteenth aspect, the projection includes an inclined surface that is inclined from a side of the disc brake rotor toward the bicycle wheel as the inclined surface becomes closer to the axis of the disc brake rotor.

In a case in which the disc brake rotor is removed from the bicycle frame by moving the disc brake rotor in the axial direction, the circumferential edge of the disc brake rotor may come into contact with the projection and interfere with the removal. In the rotor cover of the twentieth aspect, the projection includes the inclined surface. Thus, in a case in which the circumferential edge of the disc brake rotor comes into contact with the projection, the circumferential edge of the disc brake rotor is movable along the inclined surface. This limits decreases in the efficiency for removing the disc brake rotor.

The rotor cover of the present invention limits contact of an object with the disc brake rotor from a radially outer side of the disc brake rotor.

BRIEF DESCRIPTION OF THE DRAWINGS

Referring now to the attached drawings which form a part of this original disclosure.

DETAILED DESCRIPTION OF DESCRIPTION

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
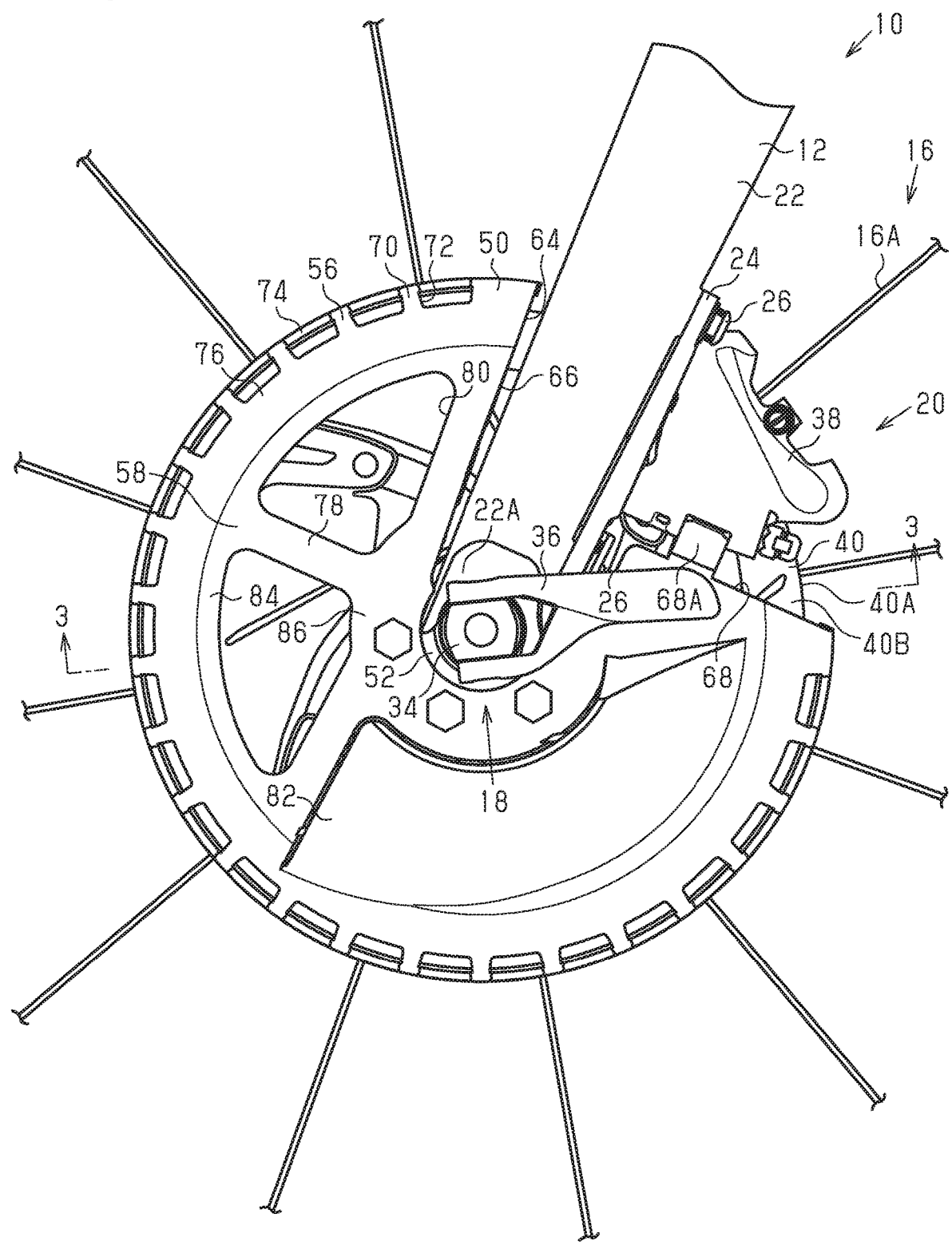
FIG. 1 is a side elevational view of a front portion of a bicycle that includes a disc brake, a disc brake rotor and a rotor cover in accordance with one embodiment.

A structure of a bicycle 10 to which a rotor cover 50 is coupled will now be described with reference to FIGS. 1 to 3. As shown in FIG. 1, the bicycle 10 includes a bicycle frame 12, a bicycle hub 14 (refer to FIG. 2) forming a center part of a bicycle wheel 16, an attachment mechanism 18 and a disc brake 20.

The bicycle frame 12 includes a frame body 22 and a mount portion 24. The frame body 22 includes an end 22A to which the bicycle hub 14 is coupled. The frame body 22 includes a front fork (not shown) and a support portion (not shown), which pivotally supports the front fork (not shown). The end 22A of the bicycle frame 12 defines a fork end of the front fork or a rear end of the support portion. The mount portion 24 is fastened by a pair of bolt members 26 to the frame body 22 at a position proximate to the end 22A. The mount portion 24 is a plate-shaped member.

Figure 2:
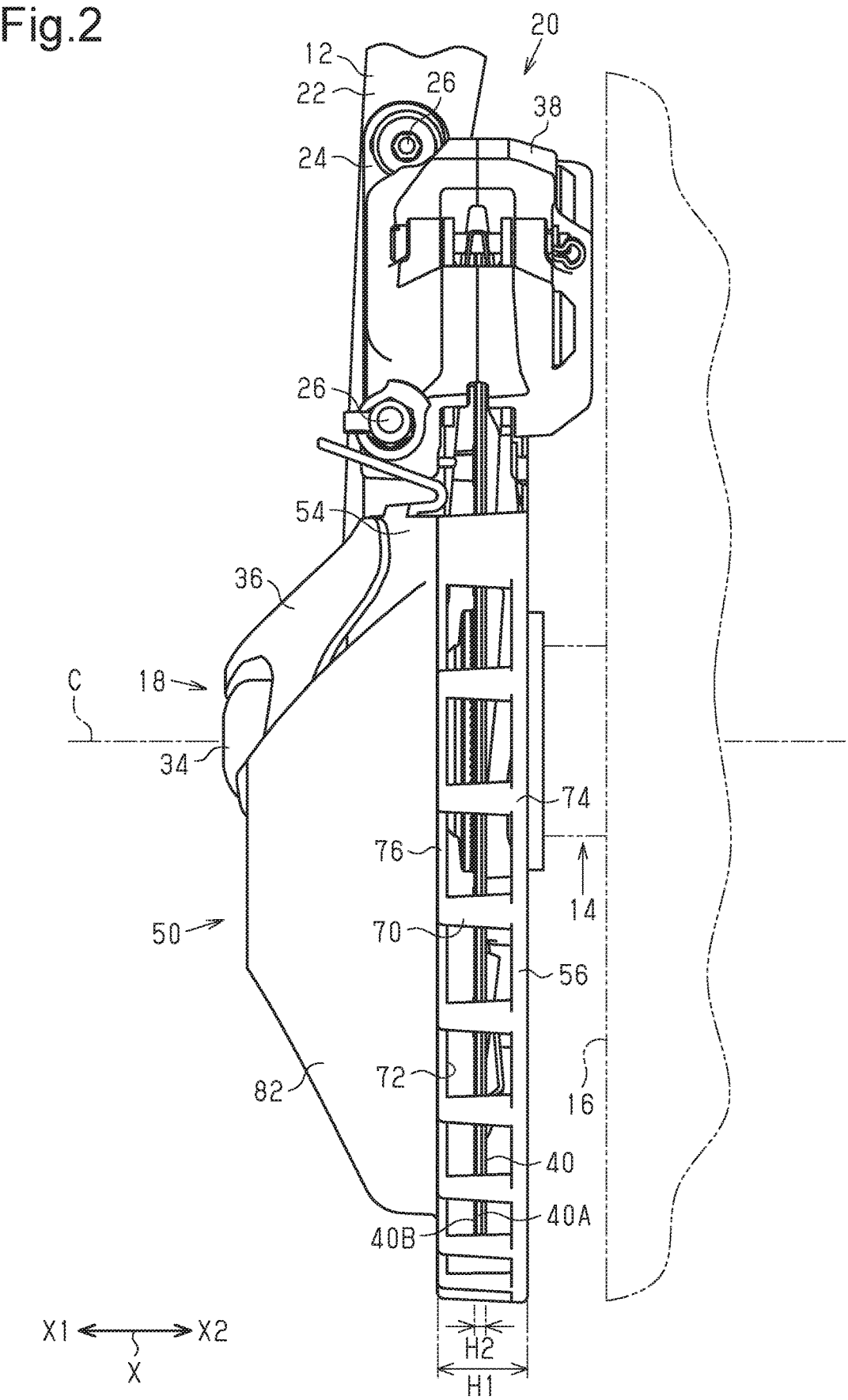
FIG. 2 is a rear view of the disc brake, the disc brake rotor and the rotor cover shown in FIG. 1.
Figure 3:
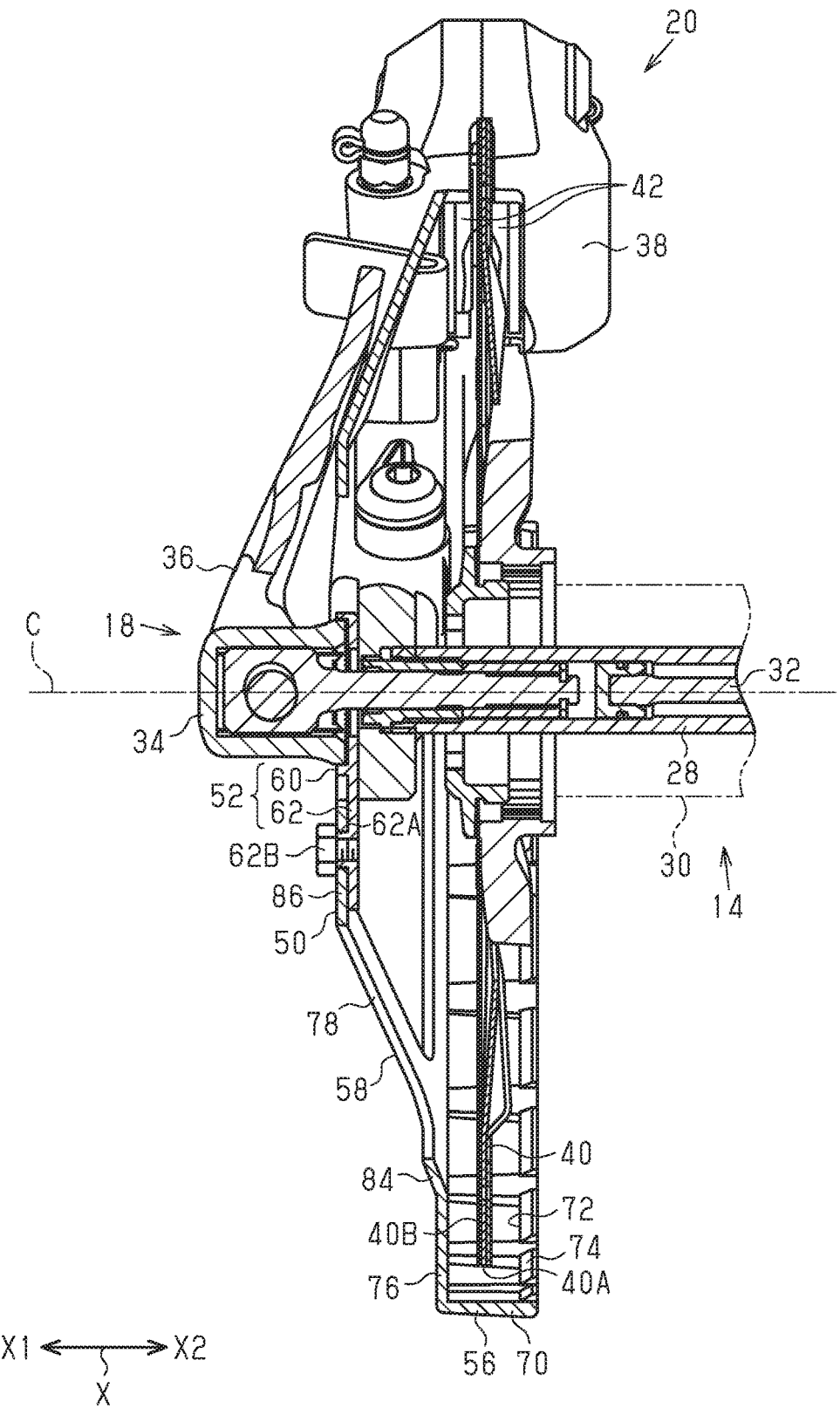
FIG. 3 is a cross-sectional view of the front portion of the bicycle taken along section line 3-3 in FIG. 1.

As shown in FIGS. 2 and 3, the bicycle hub 14 includes a hub axle 28 and a hub shell 30. The hub axle 28 is a hollow axle member. The hub axle 28 includes a circumferential portion to which the hub shell 30 is coupled so that the hub shell 30 is rotatable relative to the hub axle 28. The hub shell 30 includes a circumferential portion to which a plurality of spokes 16A of the bicycle wheel 16 are coupled.

The attachment mechanism 18 attaches the bicycle hub 14 to the bicycle frame 12 in a removable manner. The attachment mechanism 18 includes a shaft member 32, a head 34, and a lever 36. The shaft member 32 is inserted into the hub axle 28. The head 34 is coupled to an end of the shaft member 32. The lever 36 is coupled to the shaft member 32 by the head 34. In the attachment mechanism 18, the lever 36 is pivoted about the head 34 to move the head 34 in an axial direction of the hub axle 28. The attachment mechanism 18 attaches the hub axle 28 to the bicycle frame 12 by holding the end 22A of the bicycle frame 12 between the head 34 and the hub axle 28.

The disc brake 20 includes a disc brake caliper 38 (hereafter, simply referred to as "the caliper 38"), a disc brake rotor 40 (hereafter, simply referred to as "the rotor 40") and a pair of brake pads 42. The rotor 40 is rotatable relative to the bicycle frame 12. The rotor 40 is coupled to the hub shell 30 and rotated integrally with the hub shell 30. The rotor 40 includes a chamfered circumferential edge 40A. The circumferential edge 40A of the rotor 40 is corner-chamfered. In one example of chamfering, a chamfered portion has a dimension in the radial direction of the rotor 40 and a dimension in the axial direction of the rotor 40 that have a relationship included in 0.10/0.10 or greater and 0.40/0.20 or less. In another example, the circumferential edge 40A of the rotor 40 is rounded.

The caliper 38 is coupled to the bicycle frame 12. In particular, in the illustrated embodiment, the caliper 38 is coupled to the mount portion 24. As shown in FIG. 2, the rotor 40 is fitted into the recess of the caliper 38. The caliper 38 applies a braking force on the bicycle wheel 16 by holding the rotor 40 between the inner braking surfaces of the brake pads 42 (refer to FIG. 3) based on operation of an operation device (not shown). The disc brake 20 is moved by hydraulic pressure. In another example, the disc brake 20 is electrically moved.

The structure of the rotor cover 50 will now be described with reference to FIGS. 1 to 8. As shown in FIG. 1, the rotor cover 50 includes a circumferential part 56. In one example, the rotor cover 50 further includes a side surface part 58 and a positioning portion 52. The circumferential part 56 and the side surface part 58 form a cover portion 54. The rotor cover 50 covers the rotor 40. The rotor cover 50 has the form of a disc that is partially cut away. The rotor cover 50 has a larger diameter than the rotor 40. The rotor cover 50 is coupled to the bicycle frame 12. The rotor cover 50 is attached together with the hub axle 28 to the bicycle frame 12 by the attachment mechanism 18.

As shown in FIG. 3, the positioning portion 52 is positioned relative to the bicycle frame 12. The positioning portion 52 is supported by the bicycle hub 14 so that the positioning portion 52 is attachable and removable together with the bicycle hub 14 with respect to the bicycle frame 12. The positioning portion 52 includes a metal material. The positioning portion 52 includes an aluminum alloy material. In one example, a metal plate is stamped to form the positioning portion 52 as a one-piece member.

Figure 6:
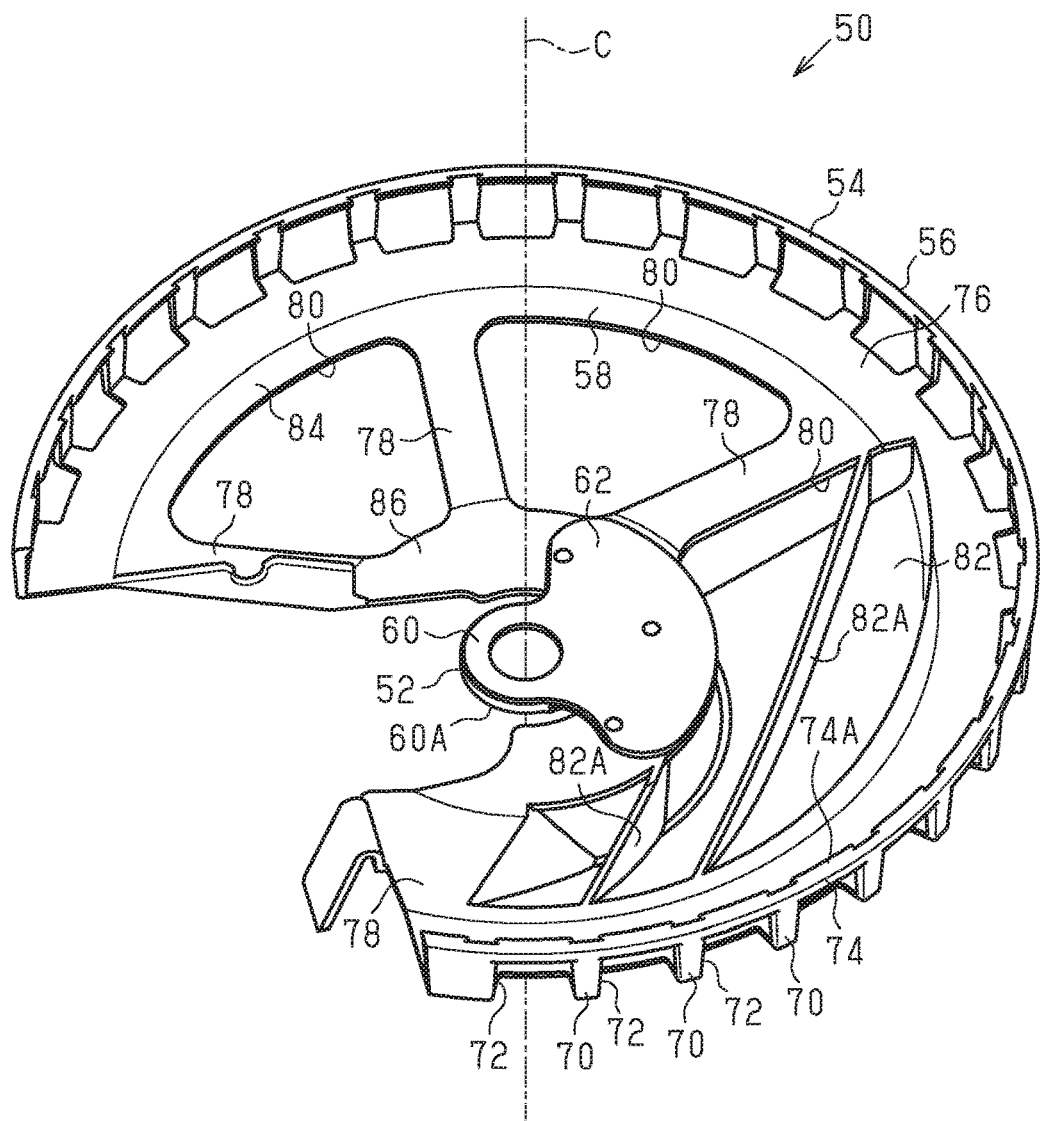
FIG. 6 is a perspective view of the rotor cover showing an inner side surface of the rotor cover shown in FIG. 1.
Figure 6:
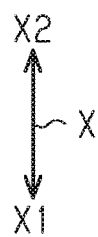

As shown in FIG. 6, the positioning portion 52 includes an annular part 60 and a coupling part 62. The annular part 60 has a center axis that is coincident to a center axis of the rotor cover 50 and a center rotational axis C of the rotor 40. The shaft member 32 (refer to FIG. 3) of the bicycle hub 14 extends through the annular part 60. The annular part 60 includes a circumferential portion 60A, which projects in an axial direction X of the rotor 40 extending from the bicycle wheel 16 toward the rotor cover 50 (hereafter, referred to as "a first direction X1"). As shown in FIG. 3, the annular part 60 is held between the head 34 and the end 22A of the bicycle frame 12. In a state in which the lever 36 of the attachment mechanism 18 is collapsed, movement of the annular part 60 is restricted relative to the bicycle frame 12.

As shown in FIG. 6, the coupling part 62 extends from the annular part 60. The coupling part 62 is coupled to the cover portion 54. It is preferred that the coupling part 62 circumferentially is coupled to the cover portion 54. It is preferred that the coupling part 62 circumferentially extends from one-quarter to one-half of the circumference of the annular part 60. Referring to FIG. 3, the coupling part 62 includes a plurality of projections 62A. The projections 62A project in the axial direction from a first side of the annular part 60 in the first direction X1. In other words, the coupling part 62 is arranged at an opposite side (the first side) of the annular part 60 with respect to the bicycle frame 12 in a direction in which the bicycle frame 12 extends. The coupling part 62 has a second side that faces in a second direction X2 of the axial direction X of the rotor 40.

The cover portion 54 is coupled to the positioning portion 52 to cover the rotor 40 (refer to FIG. 1). The cover portion 54 includes a material that differs from the material of the positioning portion 52. The cover portion 54 includes a resin material. The cover portion 54 is coupled to the positioning portion 52 in a removable manner. In particular, the cover portion 54 is removably coupled to the positioning portion 52 by a plurality of bolts 62B in reinstallable manner. The projections 62A each have an internal thread (not shown). In a state in which the bolts 62B are fastened to the internal threads of the projections 62A, the positioning portion 52 is coupled to the cover portion 54. The bolts 62B are served into the internal threads of the projections 62A from the first direction X1 to the second direction X2. The bolts 62B restrict the relative movement of the cover portion 54 and the positioning portion 52.

The cover portion 54 includes the circumferential part 56. In one example, the cover portion 54 further includes the side surface part 58, a cutaway part 64, a first edge 66, and a second edge 68. The cover portion 54 has the form of a disc that includes the cutaway part 64. As shown in FIG. 1, the bicycle frame 12 and the caliper 38 are fitted to the cutaway part 64.

The circumferential part 56 at least partially covers the circumferential edge 40A of the rotor 40 at a radially outer side of the rotor 40. The circumferential part 56 covers the circumferential edge 40A at portions where the bicycle frame 12 and the caliper 38 are not located. As shown in FIG. 2, a thickness H1 of the circumferential part 56 is greater than a thickness H2 of the rotor 40.

The circumferential part 56 includes a plurality of first pieces 70 and a plurality of first openings 72. The circumferential part 56 further includes a first connection piece 74. In one example, the circumferential part 56 further includes a second connection piece 76. The circumferential part 56 includes at least three of the first pieces 70.

The first pieces 70 face the circumferential edge 40A of the rotor 40. The first pieces 70 are arranged in a circumferential direction of the rotor 40. The first pieces 70 are arranged at a fixed interval in a circumferential direction of the rotor cover 50. Each of the first pieces 70 is rod-shaped, and has an overall L-shape. The second direction X2 is opposite to the direction side X1 in the axial direction X of the rotor 40. The first piece 70 includes a first portion located at a second side of the cover portion 54 that faces in the second direction X2 and extending in the second direction X2 of the axial direction X of the rotor 40. Each of the first piece 70 further includes a second portion inwardly bent from the first portion to extend in the radial direction of the rotor 40.

The first connection piece 74 is located closer to the bicycle wheel 16 than the rotor 40 in the axial direction X of the rotor 40. The first connection piece 74 connects adjacent ones of the first pieces 70. Thus, the first connection piece 74 connects the first pieces 70 at a position closer to the bicycle wheel 16 than the rotor 40 in the axial direction X of the rotor 40. The first connection piece 74 is rod-shaped and extends in the circumferential direction of the rotor 40.

Figure 8:
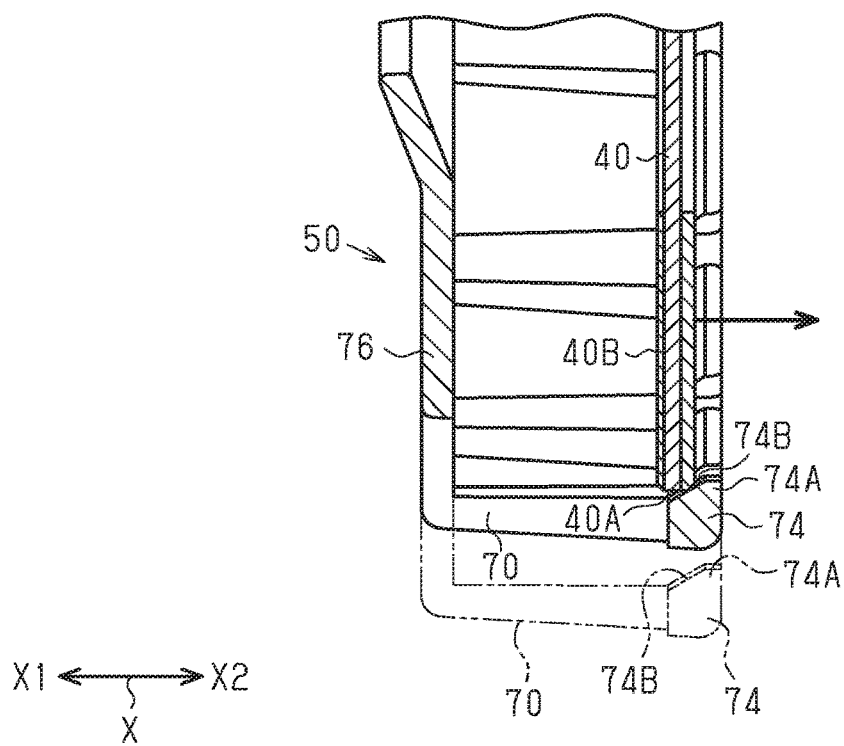
FIG. 8 is a partial cross-sectional diagram of the disc brake rotor and the rotor cover showing removal of the disc brake rotor from a bicycle frame shown in FIG. 1.

As shown in FIG. 6, the first connection piece 74 includes a plurality of projections 74A, which project toward the center rotational axis C of the rotor 40. The projections 74A are arranged between adjacent ones of the first pieces 70. Referring to FIG. 8, each of the projections 74A includes an inclined surface 74B, which is located closer to the rotor 40 in the axial direction X of the rotor 40. As the inclined surface 74B becomes closer to the center rotational axis C of the rotor 40, the inclined surface 74B is inclined from a side of the rotor 40 (refer to FIG. 3) toward the bicycle wheel 16 (refer to FIG. 3).

Figure 5:
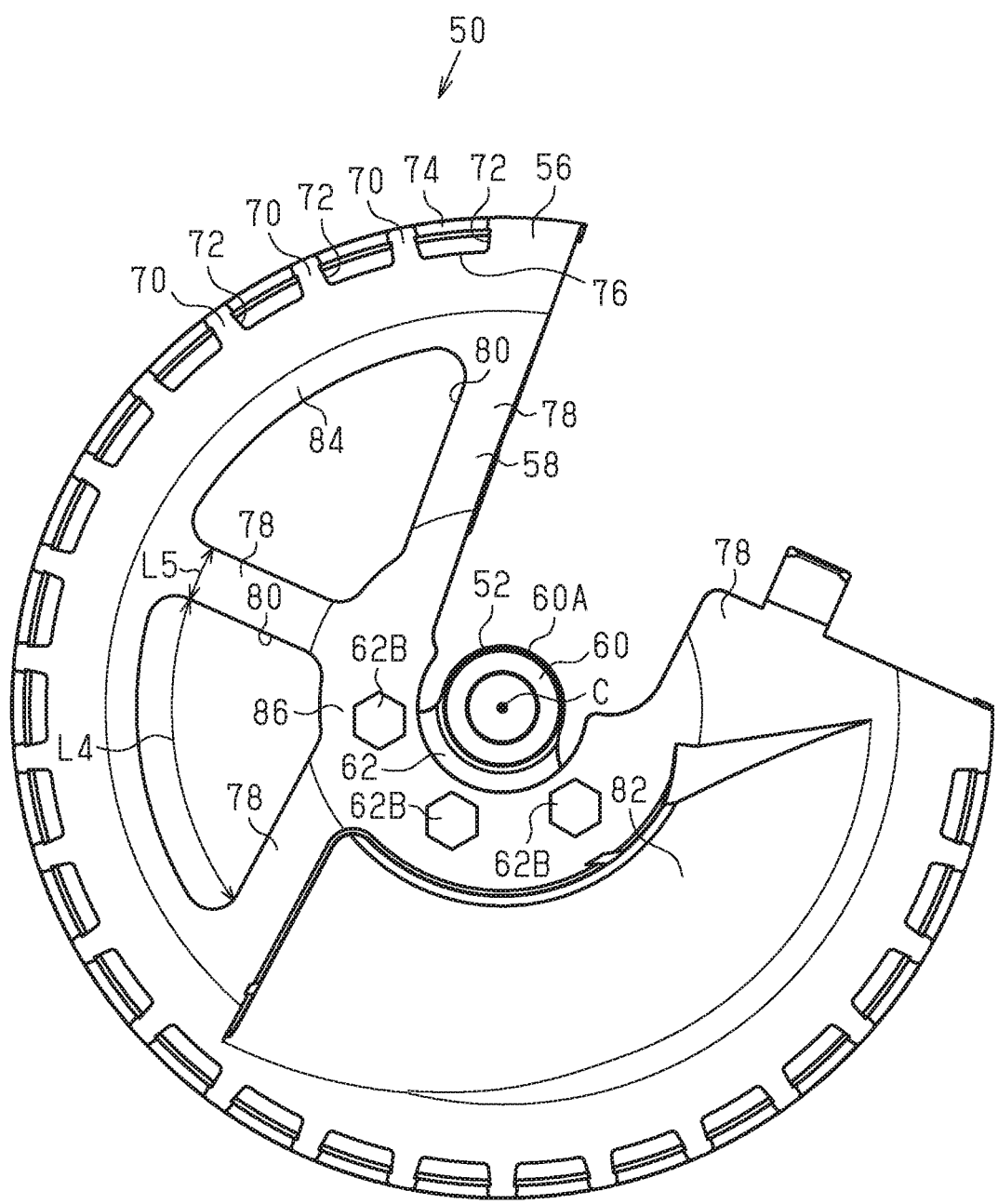
FIG. 5 is a side elevational view showing an outer side of the rotor cover shown in FIG. 1.

As shown in FIG. 5, the second connection piece 76 is arranged at a different location with respect to the first connecting piece 74 in the axial direction X of the rotor 40. The second connection piece 76 is connected to the first pieces 70. The second connection piece 76 is arranged at an opposite side of the rotor 40 with respect to the bicycle frame 10 in the axial direction X of the rotor 40. The second connection piece 76 has the form of a strip that extends in the radial direction of the rotor 40.

Figure 7:
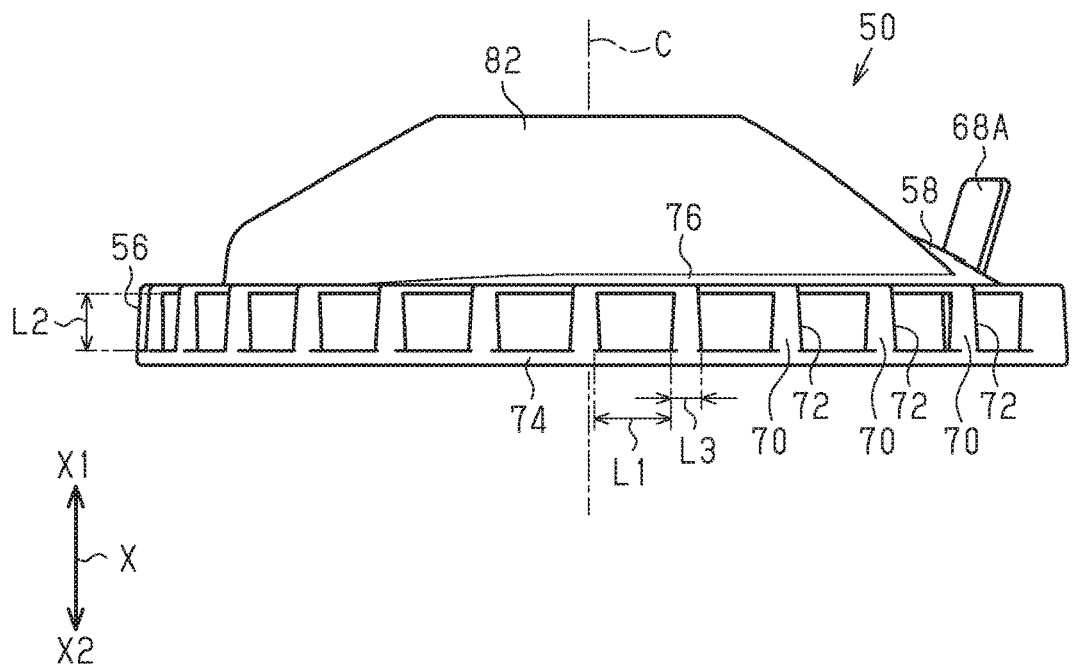
FIG. 7 is a plan view of the rotor cover shown in FIG. 1.

As shown in FIG. 7, the first openings 72 are provided between adjacent ones of the first pieces 70 in the circumferential direction of the rotor 40. The first openings 72 are defined by at least the first pieces 70 and the first connection piece 74. Each of the first openings 72 is rectangular and surrounded by adjacent ones of the first pieces 70, the first connection piece 74 and the second connection piece 76.

Each of the first openings 72 has a dimension L1 in the circumferential direction of the rotor 40. Each of the first pieces 70 has a dimension L3 in the circumferential direction of the rotor 40. The dimension L1 of each of the first openings 72 is greater than the dimension L3 of at least one of the first pieces 70. Each of the first openings 72 has a dimension L2 in the axial direction X of the rotor 40. The dimension L1 of each of the first opening 72 is greater than the dimension L2 of each of the first opening 72.

As shown in FIG. 2, the rotor 40 includes a side surface 40B opposite to the bicycle wheel 16. The side surface part 58 faces the side surface 40B, and is connected to the first pieces 70. The side surface part 58 covers the side surface 40B of the rotor 40. In one example, the side surface part 58 is connected to the first pieces 70 by the second connection piece 76. The side surface part 58 has the form of a disc that is partially cut away.

As shown in FIG. 5, the side surface part 58 includes at least two second pieces 78, a plurality of second openings 80, a third piece 82, a third connection piece 84 and a fourth connection piece 86. The second pieces 78 extend from the circumferential part 56 toward a portion facing the central portion of the rotor 40. Each of the second pieces 78 has the form of a strip that extends from the circumferential part 56 toward the center. The second piece 78 is inclined in the first direction X1 as the second piece 78 extends from a radially outer side of the rotor 40 toward the center rotational axis C.

The third connection piece 84 is continuous with the second connection piece 76. The third connection piece 84 is inclined in the first direction X1 as the third connection piece 84 extends from the second connection piece 76 toward the center rotational axis C. The third connection piece 84 is connected to adjacent ones of the second pieces 78. The third connection piece 84 has the form of a strip that extends in the circumferential direction of the rotor 40.

The fourth connection piece 86 is located at a different location with respect to the third connection piece 84 in the radial direction of the rotor 40. The fourth connection piece 86 is connected to the second pieces 78. The fourth connection piece 86 is located. closer to the center rotational axis C than the third connection piece 84 in the radial direction of the rotor 40. The fourth connection piece 86 has the form of a strip that extends in the circumferential direction of the rotor 40. The fourth connection piece 86 is parallel to the rotor 40. The coupling part 62 of the positioning portion 52 is coupled to a surface of the fourth connection piece 86 that faces the bicycle wheel 16.

The second openings 80 are provided between adjacent ones of the second pieces 78. At least two of the second openings 80 are arranged. The second pieces 78 and the second openings 80 are arranged next to one another in the circumferential direction of the rotor 40. Each of the second openings 80 is sectoral and surrounded by two adjacent ones of the second pieces 78, the third connection piece 84, and the fourth connection piece 86. The second opening 80 is smaller from the radially outer side toward the center. Each of the second openings 80 has a dimension L4, and each of the second pieces 78 has a dimension L5 along a circumference extending about the center rotational axis C of the rotor 40. The dimension L4 of the second opening 80 is greater than the dimension L5 of at least one of the second pieces 78. The dimension L4 of each of the second openings 80 at the radially outermost position is greater than the largest dimension L5 of the second pieces 78. Each of the second openings 80 is greater in area than each of the first openings 72. Since the second pieces 78 are inclined, air is easily drawn into the second openings 80, which are located between adjacent ones of the second pieces 78, from the front of the bicycle 10.

Referring to FIG. 6, the third piece 82 covers the second openings 80. The third piece 82 is at least partially located below the bicycle frame 12. The third piece 82 covers the lowest one of the second openings 80. The third piece 82 is connected to the second pieces 78 at a rear side of the bicycle 10. The third piece 82 is connected to the third connection piece 84 at a lower side of the bicycle 10. The third piece 82 is not connected to the side surface part 58 at front and upper sides of the bicycle 10. This allows air to enter between the third piece 82 and the rotor 40 from the front of the bicycle 10. The third piece 82 includes a plurality of deflectors 82A at a side opposing the rotor 40. The deflectors 82A project toward the rotor 40. The deflectors 82A extend in the direction in which the bicycle 10 travels. Thus, the air, which enters between the third piece 82 and the rotor 40, is regulated and sent toward the rear of the bicycle 10 by the deflectors 82A and also guided toward the rotor 40 by a surface of the third piece 82 that faces the rotor 40.

Figure 4:
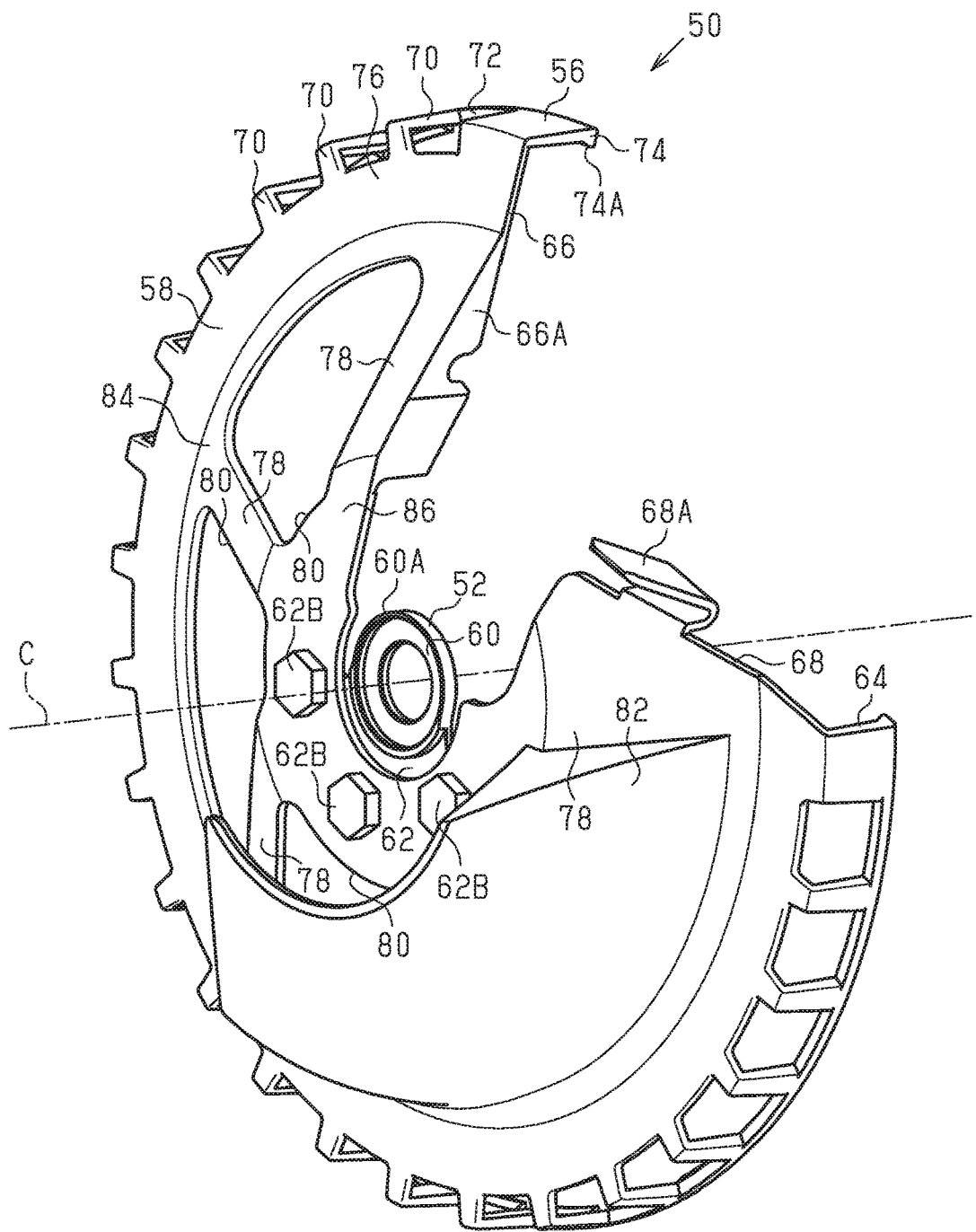
FIG. 4 is a perspective view of the rotor cover shown in FIG. 1 showing an outer side surface of the rotor cover.

As shown in FIGS. 1 and 4, the first edge 66 and the second edge 68 define a plurality of edges of the cutaway part 64. The first edge 66 faces the bicycle frame 12. The first edge 66 includes a restriction portion 66A. The restriction portion 66A extends in the axial direction X of the rotor 40. The restriction portion 66A is contactable with the bicycle frame 12 to restrict rotation of the rotor cover 50. The second edge 68 faces the caliper 38. The second edge 68 includes a flexible portion 68A. The flexible portion 68A projects from the second edge 68 toward the caliper 38. The flexible portion 68A is bent by contacting the caliper 38. The flexible portion 68A has the form of a V-shaped thin plate. The flexible portion 68A is deformed by contacting the caliper 38 such that the V-shaped portion is narrowed.

The rotor cover 50 has the operations and advantages described below. The rotor cover 50 includes the first openings 72, which are arranged in the circumferential part 56. This limits contact of an object with the rotor 40 while efficiently drawing air flowing in the traveling direction of the bicycle 10 into an inner side of the rotor cover 50.

The rotor cover 50 includes at least three first pieces 70. This decreases the dimension L1 of each of the first openings 72 in the circumferential direction as compared to a case in which the rotor cover 50 includes two or fewer first pieces 70. Thus, contact of a small object with the rotor 40 is limited.

Modifications

The above description illustrates the embodiment of the rotor cover according to the present invention and is not intended to be restrictive. The embodiment of the rotor cover of the present invention can be modified as follows. Further, two or more of the modifications can be combined.

Figure 9:
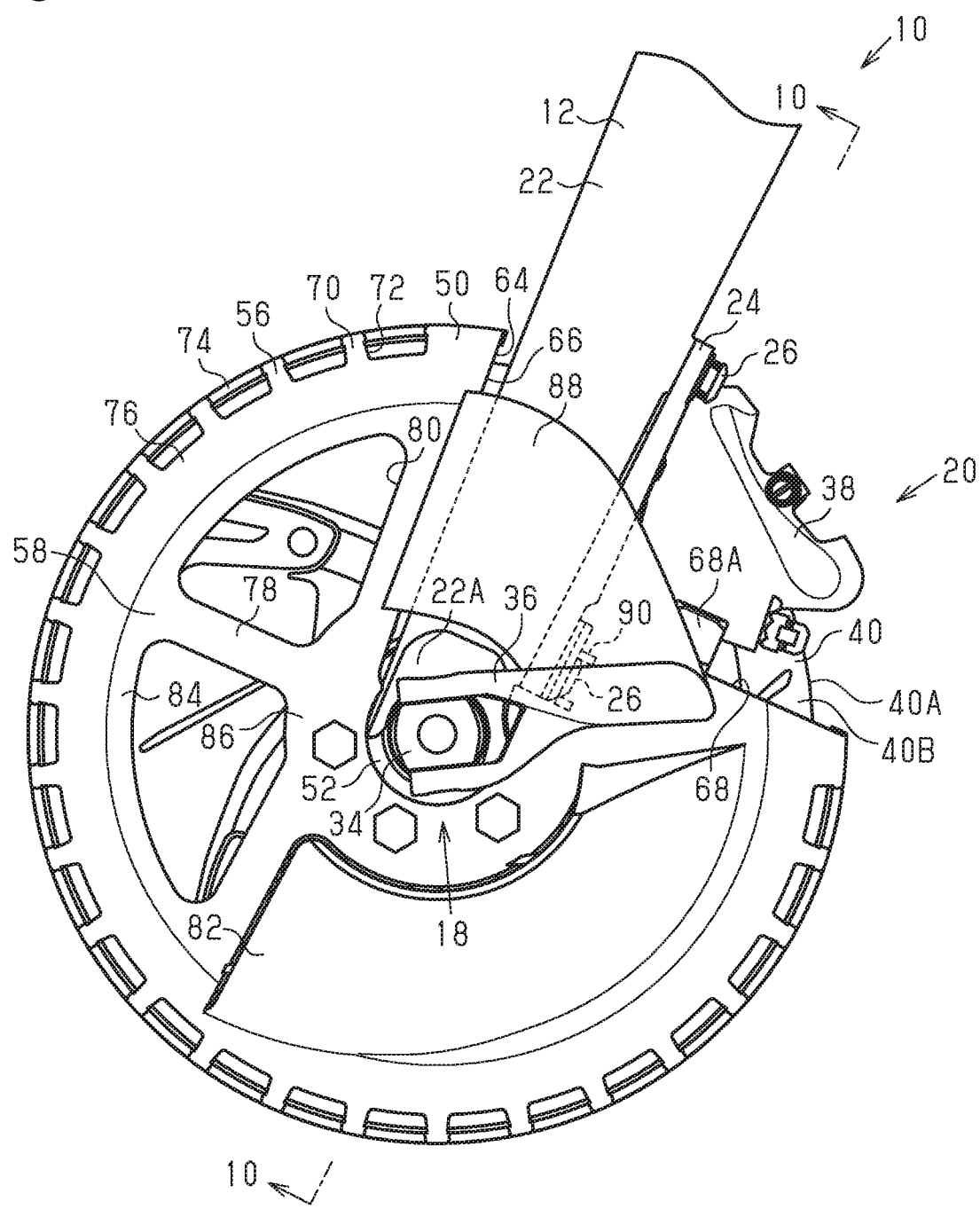
FIG. 9 is a side elevational view of a front portion of a bicycle that includes a rotor cover in accordance with a first modification.
Figure 10:
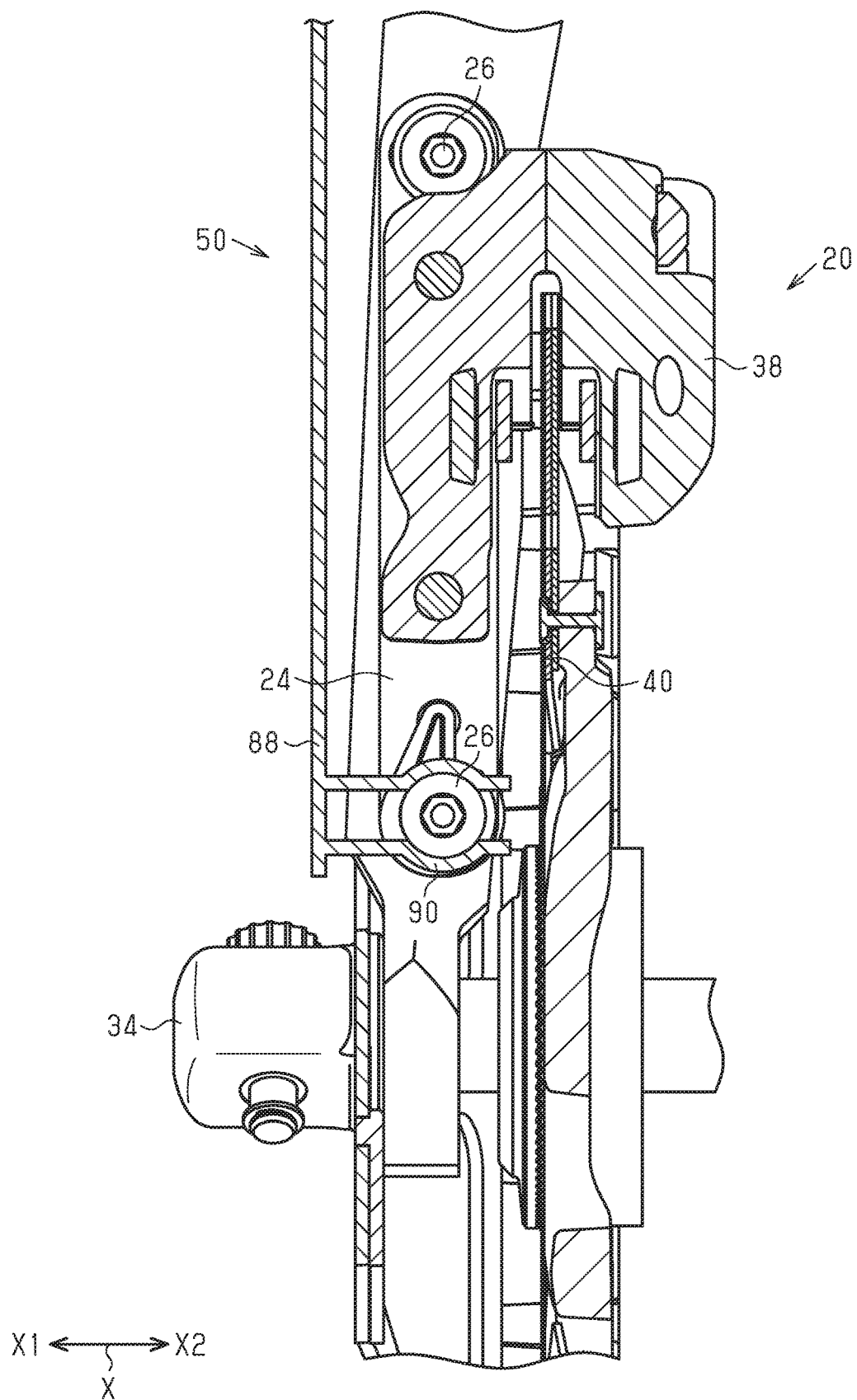
FIG. 10 is a cross-sectional view of the front portion of the bicycle taken along line section 10-10 in FIG. 9.

The positioning of the rotor cover 50 relative to the bicycle frame 12 can be changed or added as shown in FIGS. 9 and 10. FIG. 9 shows the rotor cover 50 further including an attachment portion 90, which is coupled to at least one of the bicycle frame 12 and the caliper 38. The rotor cover 50 includes a fourth piece 88. The fourth piece 88 is coupled to two of the second pieces 78 that are adjacent to each other by the cutaway part 64. The fourth piece 88 partially covers an end surface of the bicycle frame 12 that faces in the first direction X1. Also, the fourth piece 88 partially covers the caliper 38. As shown in FIG. 10, the attachment portion 90 is connected to a surface of the fourth piece 88 that is located at a side of the fourth piece 88 that faces in the second direction X2. The attachment portion 90 holds at least one of the bolt members 26 of the bicycle frame 12 by a snap-fit. More specifically, the attachment portion 90 includes a clip member configured to hold at least one of the bolt members 26 of the bicycle frame 12. In one example, the attachment portion 90 and the cover portion 54 include different materials with respect to one another. The attachment portion 90 can be formed integrally with the fourth piece 88. Alternatively, the attachment portion 90 can be formed separately from the fourth piece 88 and coupled to the fourth piece 88. In a case in which the rotor cover 50 includes the attachment portion 90, the positioning portion 52 can be omitted. In this case, the rotor cover 50 can be positioned relative to the bicycle frame 12 by the attachment portion 90.

Figure 11:
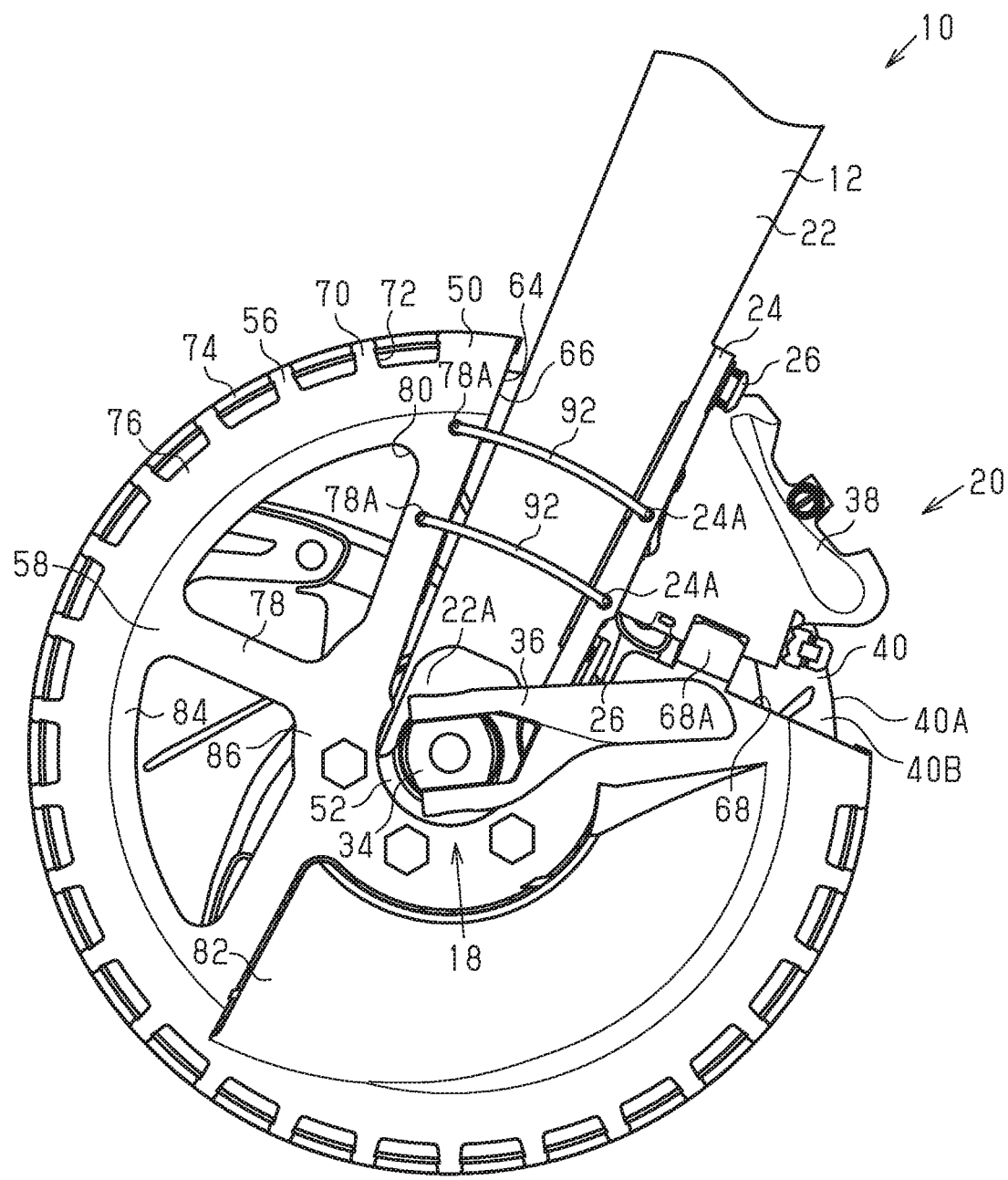
FIG. 11 is a side elevational view of a front portion of a bicycle that includes a rotor cover in accordance with a second modification.

The attachment portion 90 of the modification shown in FIGS. 9 and 10 can be changed or added to attachment portions 92 shown in FIG. 11. The attachment portions 92 shown in FIG. 11 include band members that are attachable to the bicycle frame 12. Examples of the band members include a tie-wrap, a rubber band, and a wire. The corresponding one of the second pieces 78 includes holes 78A, into which the band members are inserted. The mount portion 24 of the bicycle frame 12 includes holes 24A, into which the band members are inserted. In one example, the hand members and the cover portion 54 include different materials with respect to one another. In a case in which the rotor cover 50 includes the attachment portions 92, the positioning portion 52 can be omitted. In this case, the rotor cover 50 can be positioned relative to the bicycle frame 12 by the attachment portions 92.

Figure 12:
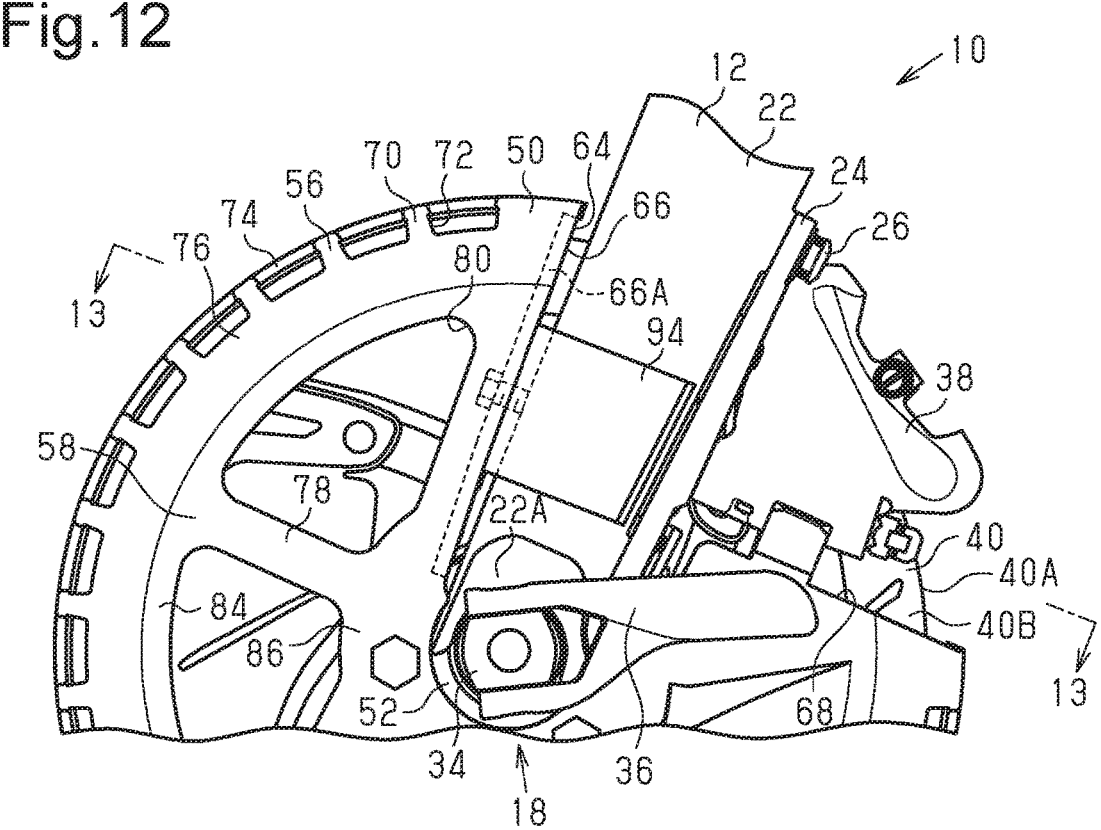
FIG. 12 is a side elevational view of a front portion of a bicycle that includes a portion of a rotor cover in accordance with a third modification.
Figure 13:
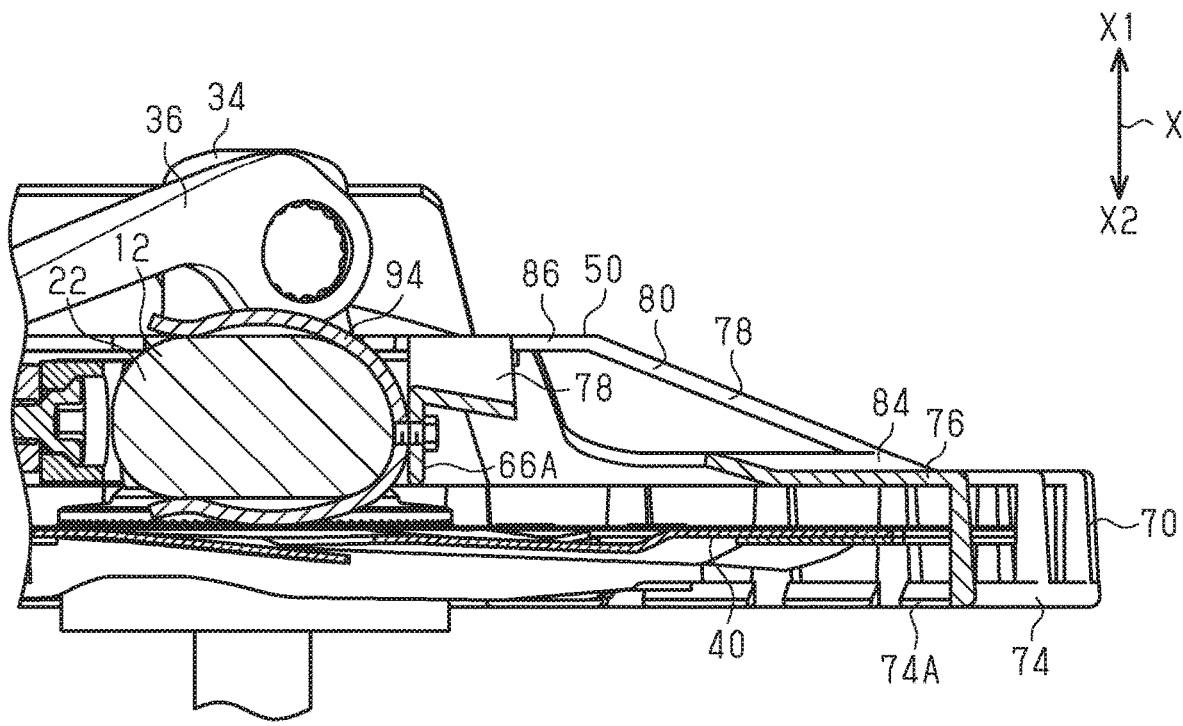
FIG. 13 is a cross-sectional view of the front portion of the bicycle taken along line section 13-13 in FIG. 12.

The attachment portion 90 of the modification shown in FIGS. 9 and 10 can be changed or added to an attachment portion 94 shown in FIGS. 12 and 13. In the rotor cover 50 shown in FIG. 12, the attachment portion 94 is coupled to the restriction portion 66A. The attachment portion 94 holds the frame body 22 of the bicycle frame 12 by a snap-fit. More specifically, the attachment portion 94 includes a clip member configured to hold the frame body 22 of the bicycle frame 12. In one example, the attachment portion 94 and the cover portion 54 include different materials with respect to one another. In a case in which the rotor cover 50 includes the attachment portion 94, the positioning portion 52 can be omitted. In this case, the rotor cover 50 can be positioned relative to the bicycle frame 12 by the attachment portion 94.

Figure 14:
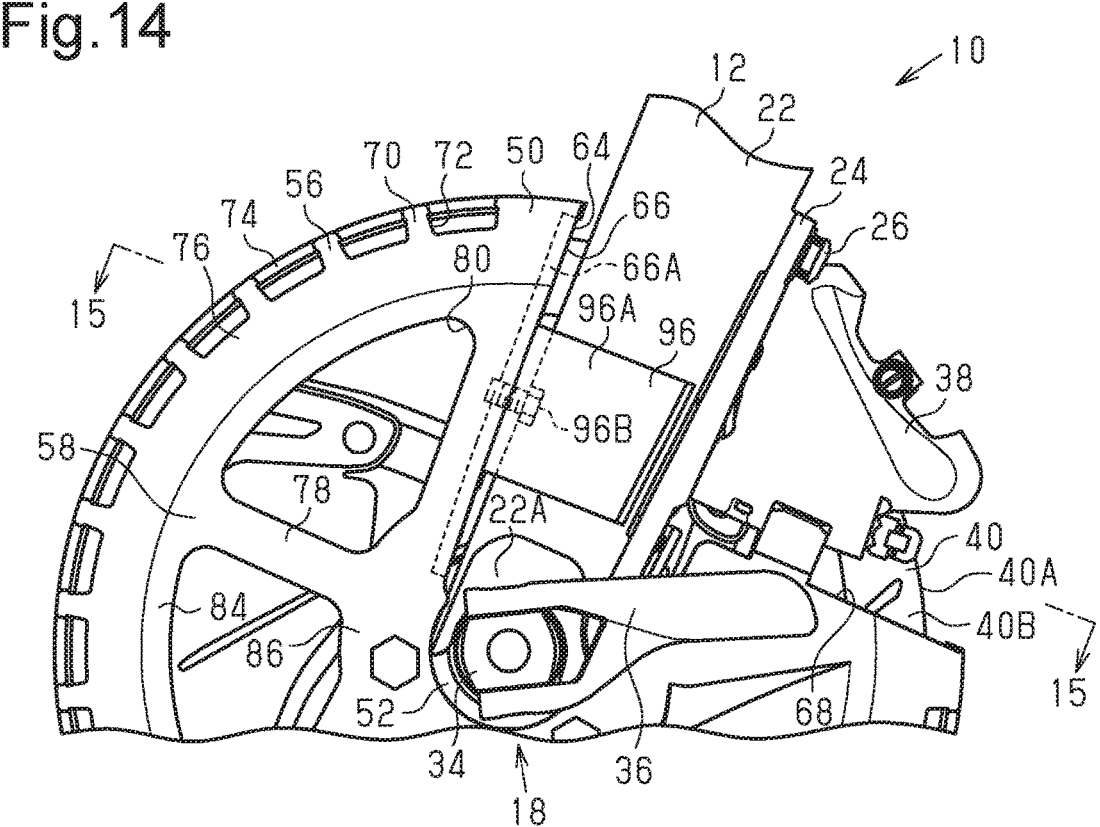
FIG. 14 is a side view of a front portion of a bicycle that includes a portion of a rotor cover in accordance with a fourth modification.
Figure 15:
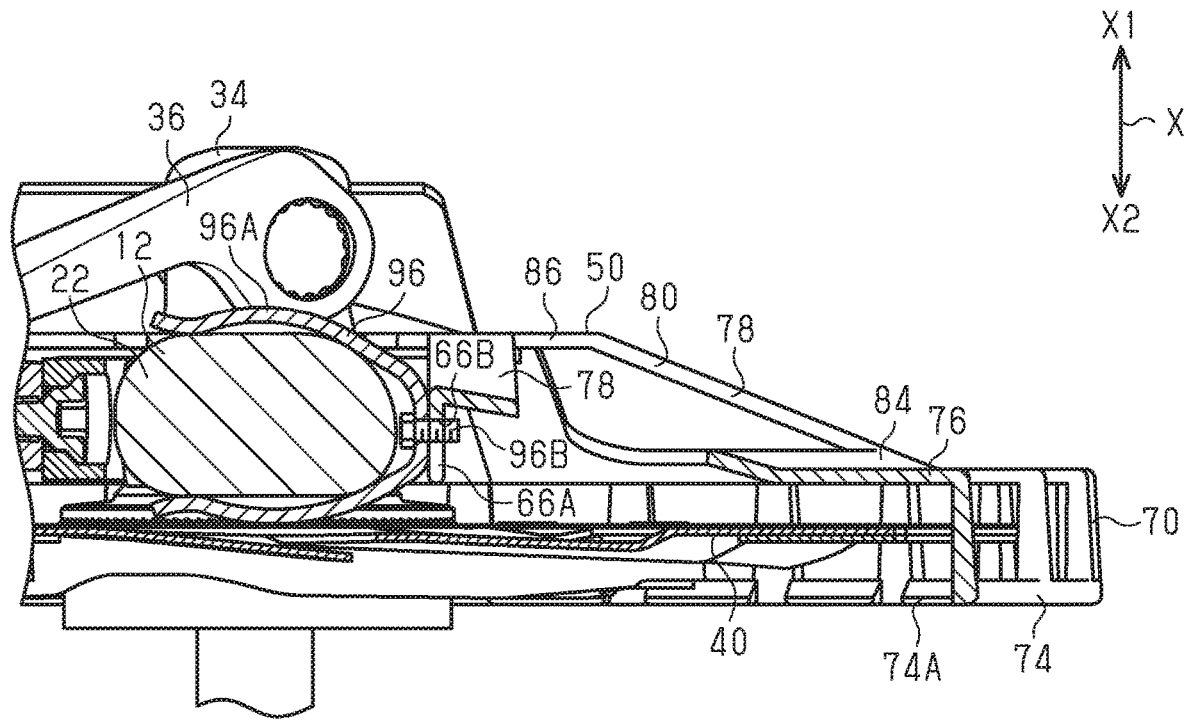
FIG. 15 is a cross-sectional view of the front portion of the bicycle taken along line section 15-15 in FIG. 14.

The attachment portion 90 of the modification shown in FIGS. 9 and 10 can be modified as shown in FIGS. 14 and 15. The bicycle frame 12 shown in FIG. 14 includes a mount portion 96. The mount portion 96 includes a curved part 96A, which holds the bicycle frame 12, and a projection 96B, which projects from the curved part 96A toward the restriction portion 66A. The restriction portion 66A of the rotor cover 50 includes a groove 66B. The rotor cover 50 is positioned relative to the bicycle frame 12 by fitting the projection 96B into the groove 66B. In this regard, the restriction portion 66A corresponds to an attachment portion that is attached to at least one of the bicycle frame 12 and the caliper 38. In one example, the restriction portion 66A is formed separately from the cover portion 54, and the restriction portion 66A and the cover portion 54 include different materials with respect to one another. In a case in which the rotor cover 50 includes the mount portion 96, the positioning portion 52 can be omitted. In this case, the rotor cover 50 can be positioned relative to the bicycle frame 12 by the restriction portion 66A.

The modification shown in FIGS. 14 and 15 can be modified so that the cover portion 54 is coupled to the mount portion 96 by a snap-fit, hook-and-loop fasteners, a magnet, or the like. In this case, the cover portion 54 and the mount portion 96 are configured to be coupled to each other.

Figure 16:
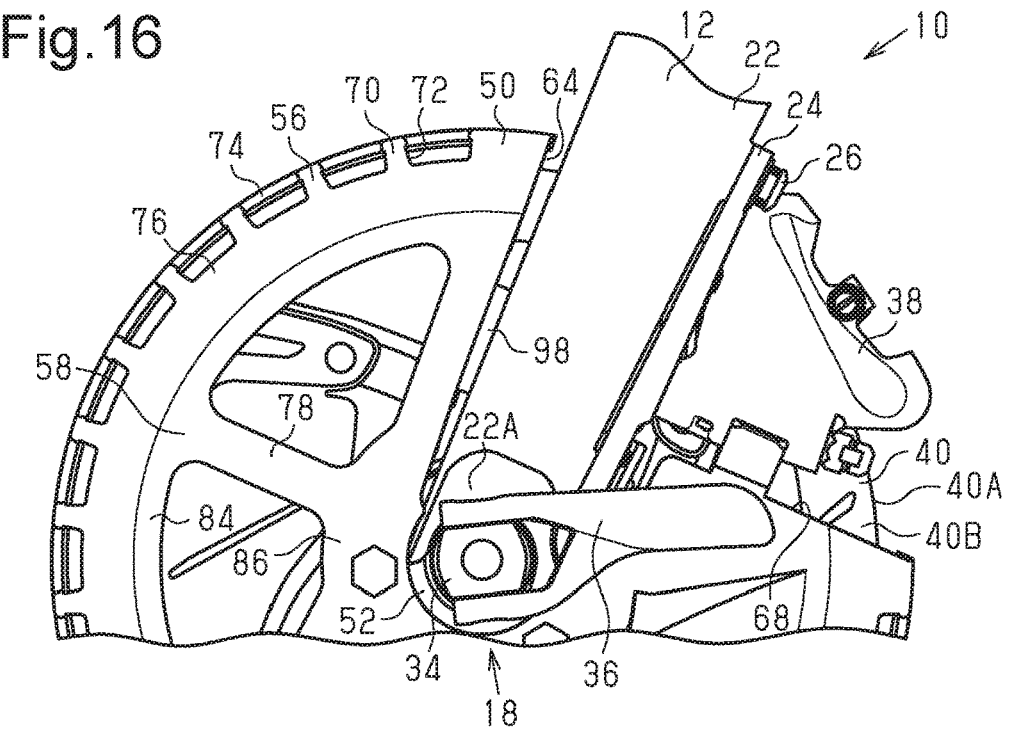
FIG. 16 is a side elevational view of a front portion of a bicycle that includes a portion of a rotor cover in accordance with a fifth modification.

The rotor cover 50 can be modified as shown in FIG. 16. The rotor cover 50 shown in FIG. 16 further includes an elastic portion 98. The elastic portion 98 is contactable with the cover portion 54 and at least one of the bicycle frame 12 and the caliper 38. In one example, the elastic portion 98 of the rotor cover 50 is coupled to the restriction portion 66A. The elastic portion 98 includes a rubber material. In another example, the elastic portion 98 includes a spring.

Figure 17:
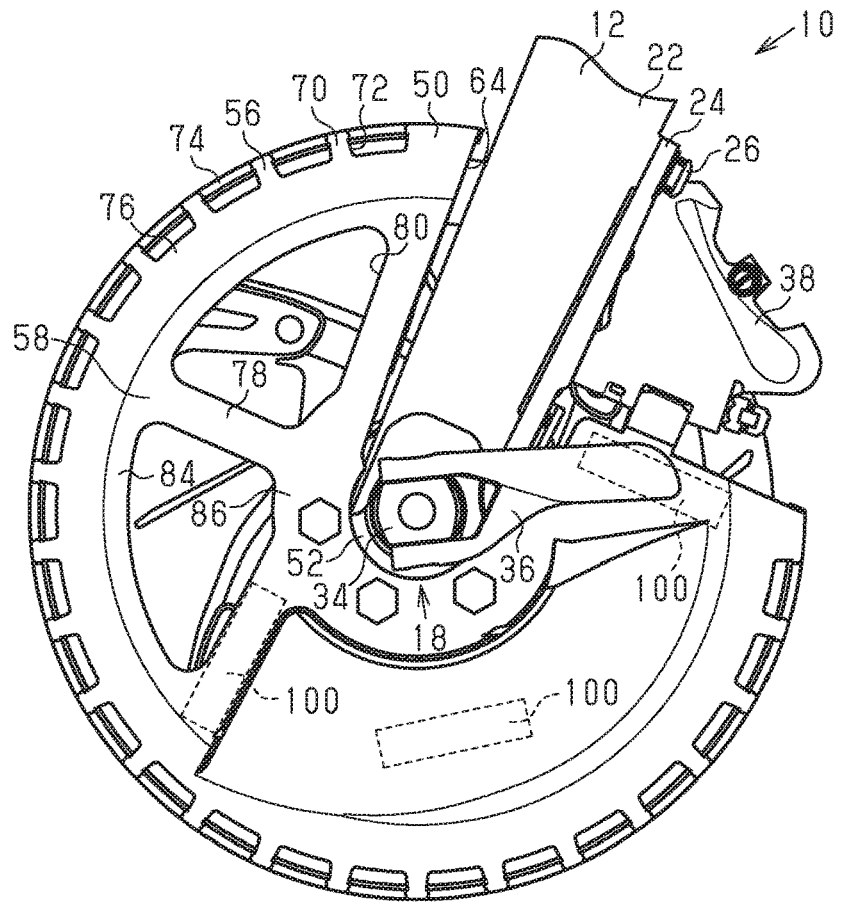
FIG. 17 is a side elevational view of a front portion of a bicycle that includes a portion of a rotor cover in accordance with a sixth modification.

The rotor cover 50 can be modified as shown in FIG. 17. The rotor cover 50 shown in FIG. 17 further includes a plurality of vibration absorption members 100, which are arranged on the cover portion 54. The vibration absorption members 100 include a rubber material. While the rotor cover 50 has a plurality of vibration absorption members 100 in the illustrated embodiment, only one of the vibration absorption member 100 can be used. In one example, the vibration absorption members 100 are arranged on a surface of the rotor cover 50 that faces the second direction X2. In one example, the vibration absorption members 100 are concentrated on a lower portion of the rotor cover 50. In this case, the lower portion of the rotor cover 50 is heavier than an upper portion of the rotor cover 50. This allows the rotor cover 50 to be stably coupled to the bicycle frame 12 as compared to a case in which the upper portion of the rotor cover 50 is heavier than the lower portion. Additionally, since the lower portion of the rotor cover 50 is heavier than the upper portion, the rotation phase of the rotor cover 50 is easily set in coupling the rotor cover 50 to the bicycle frame 12.

The rotor cover 50 can be positioned relative to the rotor 40. The positioning portion 52 is positioned relative to the rotor 40. For example, a projection projecting in the first direction X1 is arranged in the vicinity of the center rotational axis C of the rotor 40. Splines are formed on the projection. The positioning portion includes splines that are fitted to the splines of the rotor 40.

The flexible portion 68A can face the bicycle frame 12. The flexible portion 68A is bent by contacting the bicycle frame 12. In this case, the second edge 68 is located at a position opposing the bicycle frame 12. The position opposing to the bicycle frame 12 corresponds to the position of the first edge 66 of the embodiment.

The restriction portion 66A can face to the caliper 38. The restriction portion 66A, which extends in the axial direction X of the rotor 40, is contactable with the caliper 38 to restrict rotation of the rotor cover 50. In this case, the first edge 66 is located at a position opposing the caliper 38. The position opposing the caliper 38 corresponds to the position of the second edge 68 of the embodiment.

One or two first pieces 70 can be arranged. In this case, contact of an object with the rotor 40 is limited by increasing the dimension L3 of the first pieces 70 in the circumferential direction. Additionally, at least one of the first pieces 70 can be at least partially located below the center rotational axis C of the rotor 40 to limit contact of an object with the rotor 40 from a lower side.

The first connection piece 74 of the embodiment is connected to all of the first pieces 70. However, the first connection piece 74 can be modified and connected to only some of the first pieces 70. In this case, a plurality of first connection pieces 74 can be arranged.

The second connection piece 76 of the embodiment is connected to all of the first pieces 70. However, the second connection piece 76 can be modified and connected to only some of the first pieces 70. In this case, a plurality of second connection pieces 76 can be arranged.

The second connection piece 76 of the embodiment can be aligned with the rotor 40 or located closer to the bicycle wheel 16 than the rotor 40 in the axial direction X of the rotor 40.

The shape and dimensions of each of the first openings 72 can be changed. The dimension L1 of the first openings 72 in the circumferential direction of the rotor 40 can be smaller than the dimension L2 of the first openings 72 in the axial direction X of the rotor 40. The dimension L1 of the first openings 72 in the circumferential direction of the rotor 40 can be smaller than the dimension L3 of at least one of the first pieces 70 in the circumferential direction of the rotor 40. Decreases in the dimension L1 of the first openings 72 in the circumferential direction of the rotor 40 limit the contact of an object with the rotor 40. Increases in the dimension L1 of the first openings 72 in the circumferential direction of the rotor 40 allow air to be easily drawn into the inner side of the rotor cover 50. Additionally, each of the first openings 72 can be greater in area than each of the second openings 80.

Figure 18:
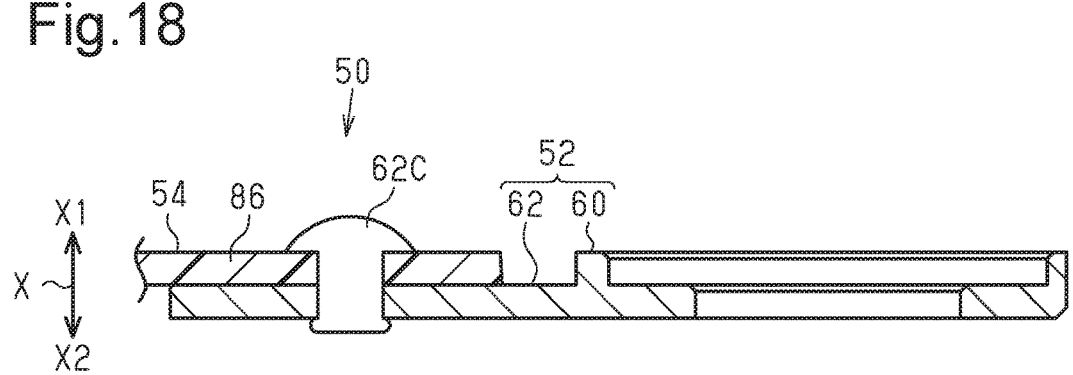
FIG. 18 is a side cross-sectional view of a portion of a rotor cover in accordance with a seventh modification.
Figure 19:
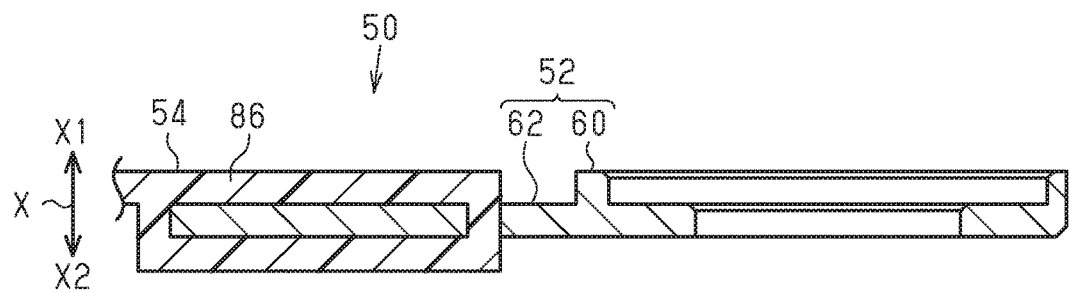
FIG. 19 is a side cross-sectional view a portion of a rotor cover in accordance with an eighth modification.

The third piece 82 can extend over all of the second openings 80. Alternatively, the third piece 82 can be omitted. The cover portion 54 can be coupled to the positioning portion 52 in a non-removable manner. In one example, as shown in FIG. 18, the cover portion 54 is coupled to the positioning portion 52 by a rivet 62C. In another example, as shown in FIG. 19, the cover portion 54 is coupled to the positioning portion 52 by insert molding. In another example, the cover portion 54 is coupled to the positioning portion 52 by swaging Any process can be used as long as the relative movement of the cover portion 54 and the positioning portion 52 is restricted.

Figure 20:
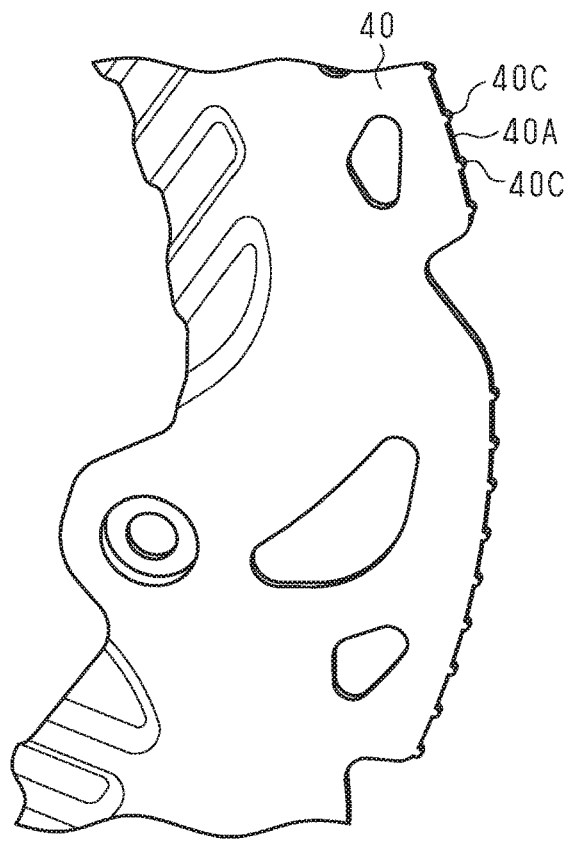
FIG. 20 is a perspective view of a portion of a disc brake rotor in accordance with a ninth modification.

The thickness H1 of the circumferential part can be smaller than the thickness H2 of the rotor 40. The rotor 40 can be modified as shown in FIG. 20. The rotor 40 shown in FIG. 20 includes a plurality of projections 40C, which are arranged on the circumferential edge 40A. The projections 40C are arranged in the circumferential direction of the rotor 40. Each of the projections 40C includes a curved circumferential end. Adjacent ones of the projections 40C are separated by a distance that is greater than a dimension of each of the projections 40C in the circumferential direction of the rotor 40. The dimension of the projection 40C in the circumferential direction of the rotor 40 is smaller than the thickness H2 (refer to FIG. 2) of the rotor 40.

The above embodiment and modifications include the embodiments described below. For example, a first embodiment includes a bicycle disc brake rotor comprising a chamfered circumferential edge. In a second embodiment, the bicycle disc brake rotor of the first embodiment is configured so that the chamfered portion is a corner chamfer. A third embodiment includes a bicycle disc brake rotor comprising a circumferential edge that includes a plurality of projections. In a fourth embodiment, the bicycle disc brake rotor of the third embodiment is configured so that each of the projections includes a curved circumferential end. A fifth embodiment includes a rotor cover that covers a disc brake rotor, which is rotatable relative to a bicycle frame, wherein the rotor cover comprises a circumferential part that at least partially covers a circumferential edge of the disc brake rotor at a radially outer side of the disc brake rotor in which the circumferential part includes a first piece facing the circumferential edge of the disc brake rotor, and the first piece is at least partially located at a lower position of a bicycle than an axis of the disc brake rotor.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle component. Accordingly, these directional terms, as utilized to describe the bicycle component should be interpreted relative to a bicycle in an upright riding position on a horizontal surface and that is equipped with the bicycle component. The terms "left" and "right" are used to indicate the "right" when referencing from the right side as viewed from the rear of the bicycle, and the "left" when referencing from the left, side as viewed from the rear of the bicycle.

Also, it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A rotor cover for covering a disc brake rotor, which is rotatable relative to a bicycle frame, the rotor cover comprising:
    a circumferential part configured to at least partially cover a circumferential edge of the disc brake rotor at a radially outer side of the disc brake rotor, the circumferential part including
        at least three first pieces facing the circumferential edge of the disc brake rotor,
        a plurality of first openings being provided between adjacent ones of the first pieces in a circumferential direction of the disc brake rotor, and
        a first connection piece connected to adjacent ones of the first pieces, the first connection piece being located closer to a bicycle wheel than the disc brake rotor in an axial direction of the disc brake rotor.

2. The rotor cover according to claim 1, wherein
    the circumferential part further includes a second connection piece arranged at a different location with respect to the first piece in an axial direction of the disc brake rotor when the rotor cover covers the disc brake rotor, and
    the second connection piece is connected to the first pieces.

3. The rotor cover according to claim 2, wherein
    the second connection piece is arranged at an opposite side of the disc brake rotor with respect to a bicycle wheel in an axial direction of the disc brake rotor when the rotor cover covers the disc brake rotor.

4. The rotor cover according to claim 1, wherein
    each of the first openings has a greater dimension than at least one of the first pieces in a circumferential direction of the disc brake rotor.

5. The rotor cover according to claim 1, wherein
    each of the first openings has a dimension in a circumferential direction which is greater than a dimension thereof in an axial direction of the disc brake rotor.

6. The rotor cover according to claim 1, further comprising:
    a side surface part facing a side surface of the disc brake rotor that is opposite to a bicycle wheel when the rotor cover that covers the disc brake rotor, the side surface part being connected to each of the first pieces.

7. The rotor cover according to claim 6, wherein
    the side surface part includes a second opening, the side surface part further including a side surface facing in an axial direction of the disc brake rotor, the second opening being formed on the side surface.

8. The rotor cover according to claim 7, wherein
    the side surface part further includes at least two second pieces that extend from the circumferential part toward a portion facing a central portion of the disc brake rotor when the rotor cover covers the disc brake rotor, and
    the second opening is provided between adjacent ones of the second pieces.

9. The rotor cover according to claim 8, wherein
    the second pieces and the second opening are arranged next to one another in a circumferential direction of the disc brake rotor when the rotor cover covers the disc brake rotor, and
    the second opening has a greater dimension than at least one of the second pieces along a circumference extending about a center rotational axis of the disc brake rotor.

10. The rotor cover according to claim 7, wherein
the second opening has a larger area than each of the first openings.

11. The rotor ver according to any claim 7, wherein
the second opening is one of at least two second openings.

12. The rotor cover according to claim 7, wherein
the side surface part further includes a third piece that covers the second opening.

13. The rotor cover according to claim 12, wherein
the rotor cover is to be positioned relative to the bicycle frame, and
the third piece is at least partially located below the bicycle frame.

14. The rotor cover according to claim 1, further comprising
a positioning portion that is to be positioned relative to the bicycle frame.

15. The rotor cover according to claim 1, wherein
the first connection piece includes a projection that projects toward an axis of the disc brake rotor when the rotor cover covers the disc brake rotor.

16. The rotor cover according to claim 15, wherein
the projection includes an inclined surface that is inclined from a side of the disc brake rotor toward the bicycle wheel as the inclined surface becomes closer to the axis of the disc brake rotor when the rotor cover covers the disc brake rotor.

17. A rotor cover for covering a disc brake rotor, which is rotatable relative to a bicycle frame, the rotor cover comprising:
a circumferential part configured to at least partially cover a circumferential edge of the disc brake rotor at a radially outer side of the disc brake rotor, the circumferential part including
a first piece facing the circumferential edge of the disc brake rotor,
a first connection piece connected to the first piece at a side closer to a bicycle wheel than the disc brake rotor in an axial direction of the disc brake rotor,
a first opening being defined by at least the first piece and the first connection piece, and
a first connection piece connected to adjacent ones of the first pieces, the first connection piece being located closer to a bicycle wheel than the disc brake rotor as viewed in an axial direction of the disc brake rotor.

18. The rotor cover according to claim 17, wherein
the first piece is one of a plurality of first pieces arranged in a circumferential direction of the disc brake rotor.

* * * * *